US012583270B2

(12) United States Patent
Lee

(10) Patent No.: US 12,583,270 B2
(45) Date of Patent: Mar. 24, 2026

(54) TIRE PRESSURE SENSOR ATTACHED TO AN AIR VALVE

(71) Applicant: Chia-Shiang Lee, Taipei City (TW)

(72) Inventor: Chia-Shiang Lee, Taipei City (TW)

(73) Assignee: SYSGRATION LTD.

( * ) Notice: Subject to any disclaimer, the term of this patent is extended or adjusted under 35 U.S.C. 154(b) by 392 days.

(21) Appl. No.: 18/381,184

(22) Filed: Oct. 18, 2023

(65) Prior Publication Data

US 2024/0131880 A1     Apr. 25, 2024
US 2024/0227470 A9     Jul. 11, 2024

(30) Foreign Application Priority Data

Oct. 25, 2022    (TW) .................................. 111140467

(51) Int. Cl.
B60C 23/04        (2006.01)
G01L 17/00        (2006.01)

(52) U.S. Cl.
CPC .......... B60C 23/0494 (2013.01); G01L 17/00 (2013.01)

(58) Field of Classification Search
CPC ...... G01L 17/00; B60C 23/0494; B60C 29/02
See application file for complete search history.

(56) References Cited

U.S. PATENT DOCUMENTS

| | | | |
|---|---|---|---|
| 8,539,826 B2 * | 9/2013 | Yu ....................... | B60C 23/0494 |
| | | | 73/146 |
| 9,027,397 B2 * | 5/2015 | Chen ................... | B60C 23/0494 |
| | | | 73/146.5 |
| 2012/0017672 A1 * | 1/2012 | Uh ........................ | B60C 29/064 |
| | | | 73/146.8 |

* cited by examiner

Primary Examiner — Kristina M Deherrera
Assistant Examiner — Jean F Morello

(57) ABSTRACT

A tire pressure sensor attached to an air valve includes a body and two wings. The body has a face located between the two wings. The wings have ridges extending from the face, in a gradually expanding curved arc, to form an enlarged end. The ridges and the face together form a groove therebetween. An air valve includes a tube, a nut and a connector which is connected to one end of the tube. The nut is threaded onto the tube. The connector has end portions extending from two ends thereof. The connecting portion of the connector is engaged with the groove, and the protrusions abut against the inside of the ridges. The nut is rotated to drive the tube, and the connector presses the protrusions to contact against the ridges. This achieves a one-time lock attachment in a single step, offering improved functionality.

8 Claims, 12 Drawing Sheets

TIRE PRESSURE SENSOR ATTACHED TO AN AIR VALVE

FIELD OF THE INVENTION

The present invention relates to a tire pressure sensor, and more particularly, to a tire pressure sensor attached to an air valve.

BACKGROUND OF THE INVENTION

Generally, in the past, drivers needed to know the pressure of their tires, which typically involved using a tire pressure gauge at the air valve to measure it. This process was not only cumbersome but also prevented drivers from constantly monitoring and controlling the tire pressure. This may put the drivers them in a potentially dangerous situation. Consequently, the industry responded to the need for product advancement and developed a wireless tire pressure sensor.

As described in Taiwanese Patent No. M555942, titled "Structural Improvement of Tire Pressure Sensor". As shown in FIGS. 1 and 2 of the patented structure, a bolt passes through the elongated slot of the tire pressure sensor's body and is secured to the upper end of the air valve, thereby completing the assembly of the body and air valve. Subsequently, as illustrated in FIG. 7 of the patent and indicated by the dashed lines, when it is further combined with the wheel, the air valve protrudes from the assembly hole of the wheel rim. The wheel and air valve are tightly secured by threading a positioning element (i.e., the air valve nut) onto the outer end of the wheel's air valve.

The installation procedure of the tire pressure sensor, as described above, involves a two-stage process. First, the bolt is threaded through the air valve to assemble the body and air valve in the first stage. Then, in the second stage, the wheel and air valve are tightened by the air valve nut. This two-stage locking installation process leads to complications in the assembly and extends the assembly time.

Furthermore, the above-mentioned method of securing the tire pressure sensor's body to the upper end of the air valve using a bolt and then forcibly tightening the wheel and air valve with a positioning element (i.e., the air valve nut) can result in the body of the tire pressure sensor tilting due to centrifugal force during wheel rotation while driving. This tilt can affect the stability of its detection and usage.

The present invention intends to provide a tire pressure sensor attached to an air valve to eliminate the shortcomings mentioned above.

SUMMARY OF THE INVENTION

The present invention relates to a tire pressure sensor attached to an air valve, and comprises a sensor which comprises a body and two wings formed to the body. The body includes a face located between the two wings, and the two wings have two opposing ridges projecting towards respective insides of the two wings. The ridges, the face and the wings together form a groove with an expanding opening. The ridges each have an enlarged end which is directed toward one side of the expanding opening.

A reinforcing member is installed inside the body and includes a plate, and two arms extend from two ends of the plate. The plate is connected to the face, and the two arms contact the ridges.

An air valve comprises a tube, a nut and a connector connected to one end of the tube. The connector has two end portions extending from two ends of the connector. The two end portions protrude beyond the tube. The end portions each have a protrusion. The tube passes through a space between the face and the two wings and is connected to the body. The end portions of the connector is engaged in the groove. The protrusions abut the inside of the ridges. The nut is connected to the tube and located close to the connector to press the protrusions against the inside of the ridges.

Through the cooperation of the above-mentioned structure, the present invention, by threading the tube of the air valve through the body and the wheel rim hole between the face and the wings, allows one end of the connector to engage with the groove. This enables the tube to be forcibly assembled onto the wheel rim by tightening the nut in a single step, achieving a one-time lock attachment and exhibiting clear advancements. Thus, the objectives and utility of the present invention are achieved.

Furthermore, the present invention uses the gradually increasing interference between the inside of the ridges, extended in a gradually expanding curved arc, and the protrusion of the air valve to suppress the centrifugal force-induced tilting of the body caused by the rotating wheel during driving. This effectively enhances the firmness of the installation assembly and the stability of tire pressure detection usage.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
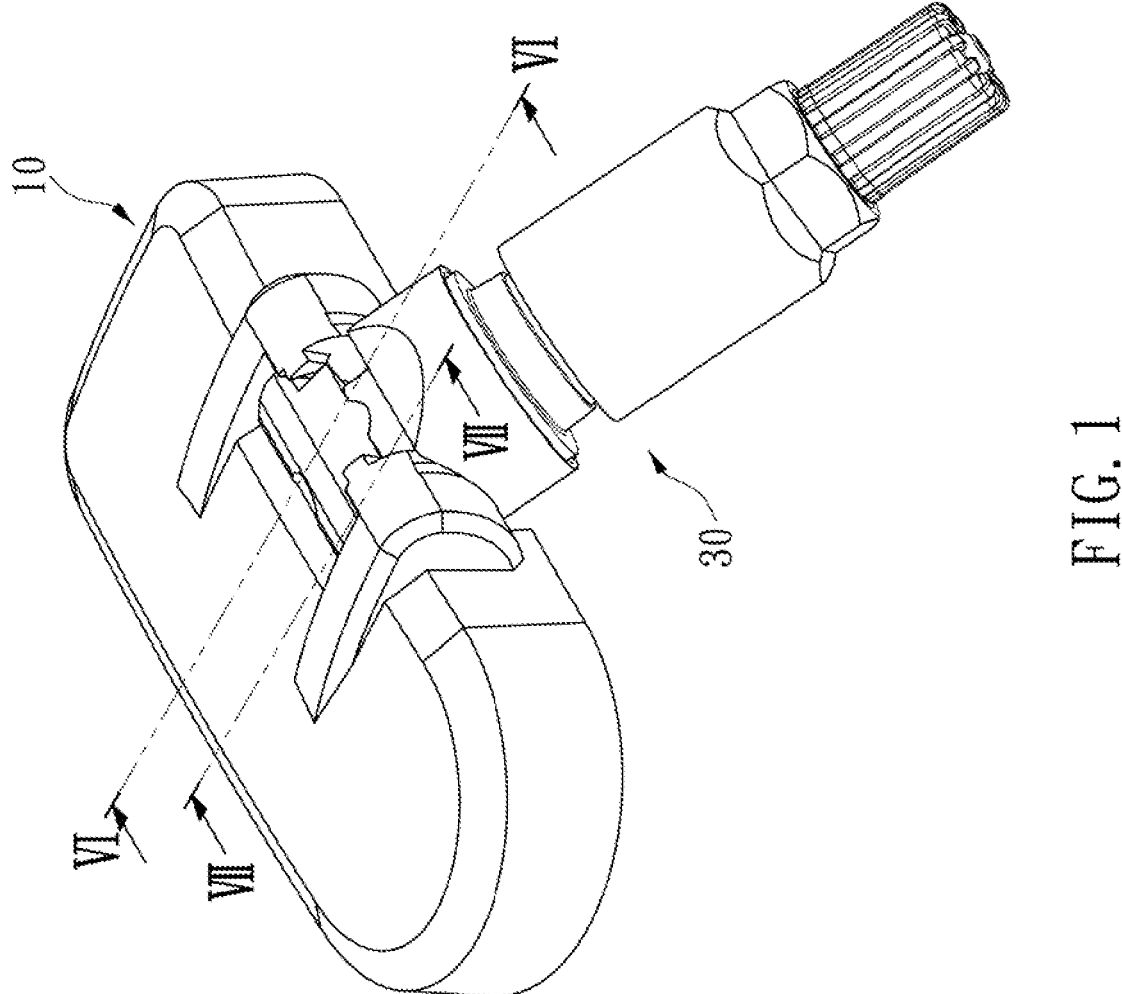
FIG. 1 is a perspective view of the present invention.

Referring to FIGS. 1-14, the tire pressure sensor attached to an air valve of the present invention comprises a sensor

(10) comprising a body (11) and two wings (12) which are formed to the body (11). The body (11) includes a face (111) located between the two wings (12), and the two wings (12) have two opposing ridges (13) projecting towards respective insides of the two wings (12). The ridges (13), the face (111) and the wings (12) together form a groove (132) with a gradually expanding opening (133). The ridges (13) each have an enlarged end (131) which is directed toward one side of the expanding opening (133). Each of the two ridges (13) includes a slot (130) defined therethrough.

A reinforcing member (20) is installed inside the body (11) and includes a plate (21), and two arms (22) extend from two ends of the plate (21). The plate (21) is connected to the face (111) of the body (11). The two arms (22) contact the ridges (13).

An air valve (30) comprises a tube (31), a nut (32) and a connector (33) that is connected to a first end of the tube (31). The connector (33) has two end portions (331) extending from two ends of the connector (33). The two end portions (331) protrude beyond the tube (31). The end portions (331) each having a protrusion (332). The tube (31) passes through a space between the face (111) and the two wings (12), and is connected to the body (11). The end portions (331) of the connector (33) are engaged in the groove (132). The protrusions (332) abut the inside of the ridges (13). The nut (32) is connected to the tube (31) and located close to the connector (33) to press the protrusions (332) against the inside of the ridges (13).

Figure 2:
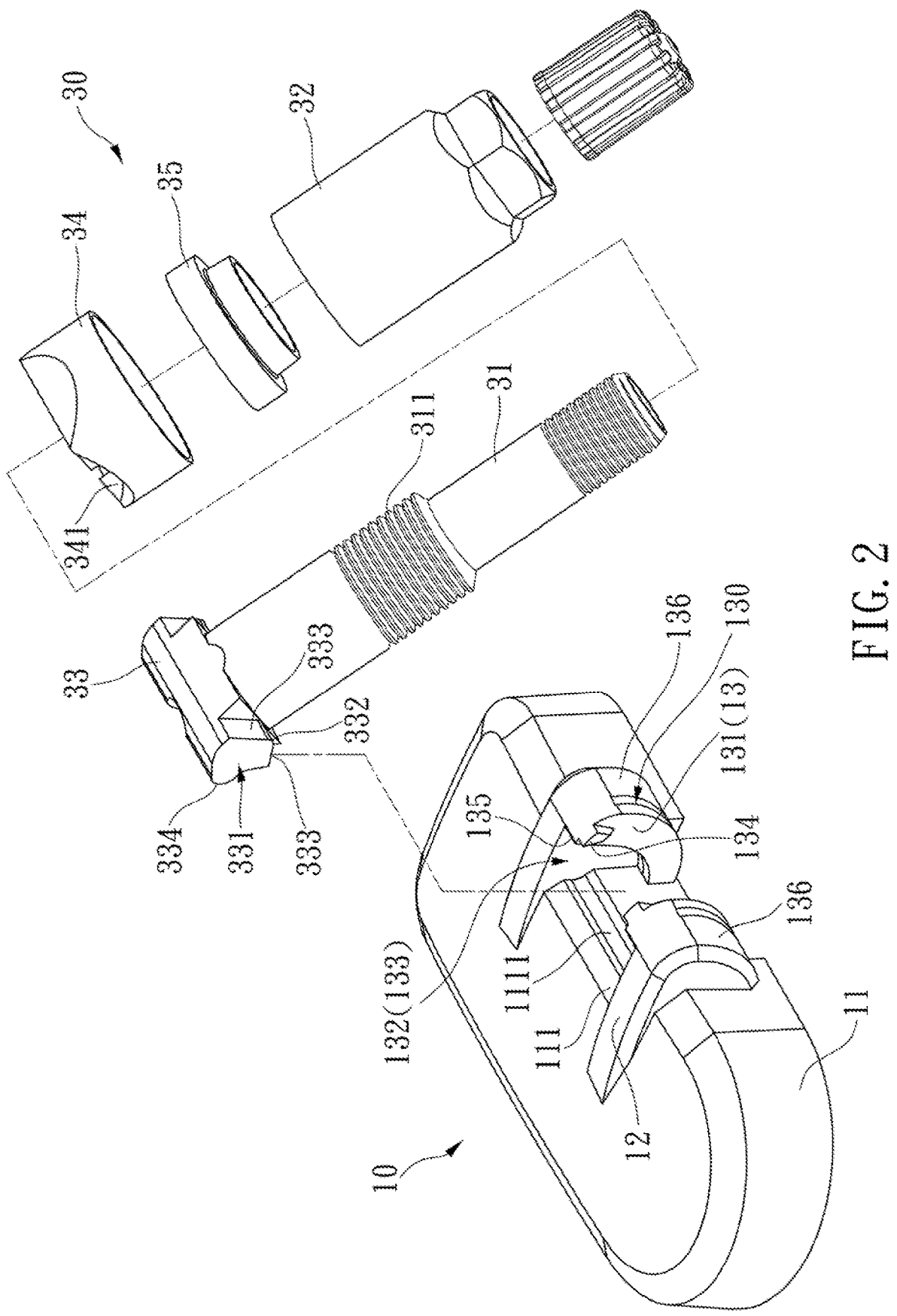
FIG. 2 is an exploded view of the present invention.
Figure 4:
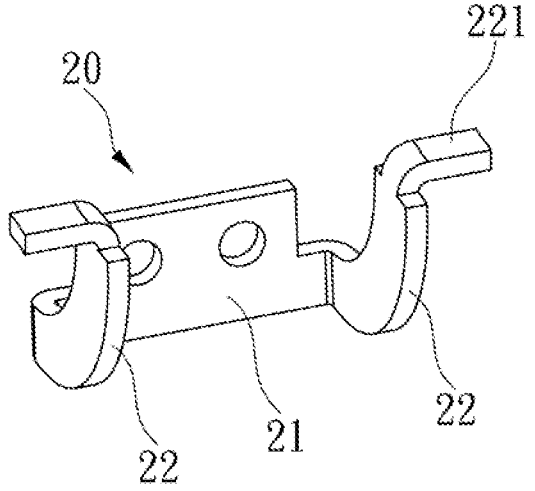
FIG. 4 is a perspective view of the reinforcing member of the present invention.
Figure 5:
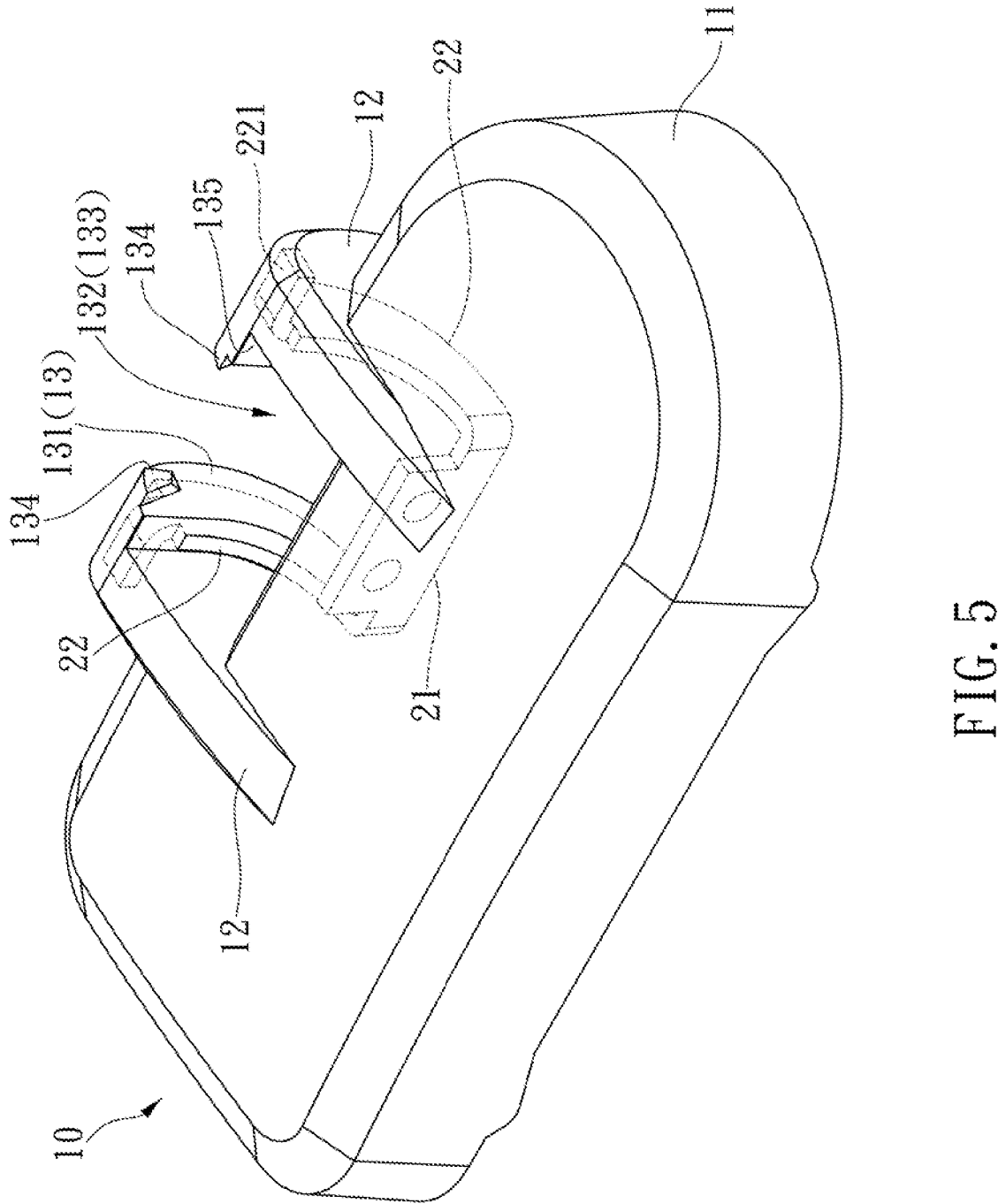
FIG. 5 is another perspective view of the present invention.
Figure 6:
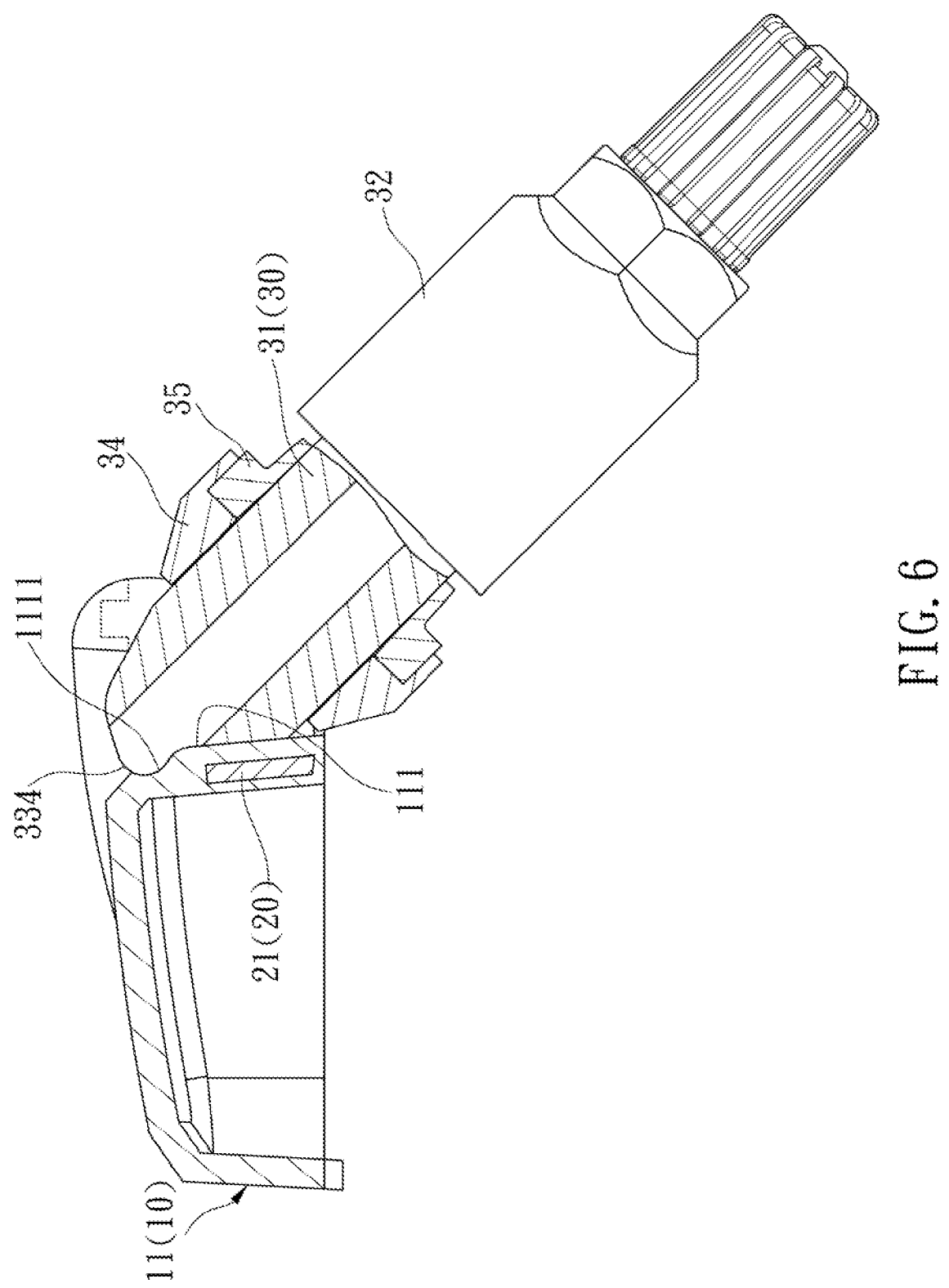
FIG. 6 is a cross-sectional view taken along line VI-VI of FIG. 1.
Figure 7:
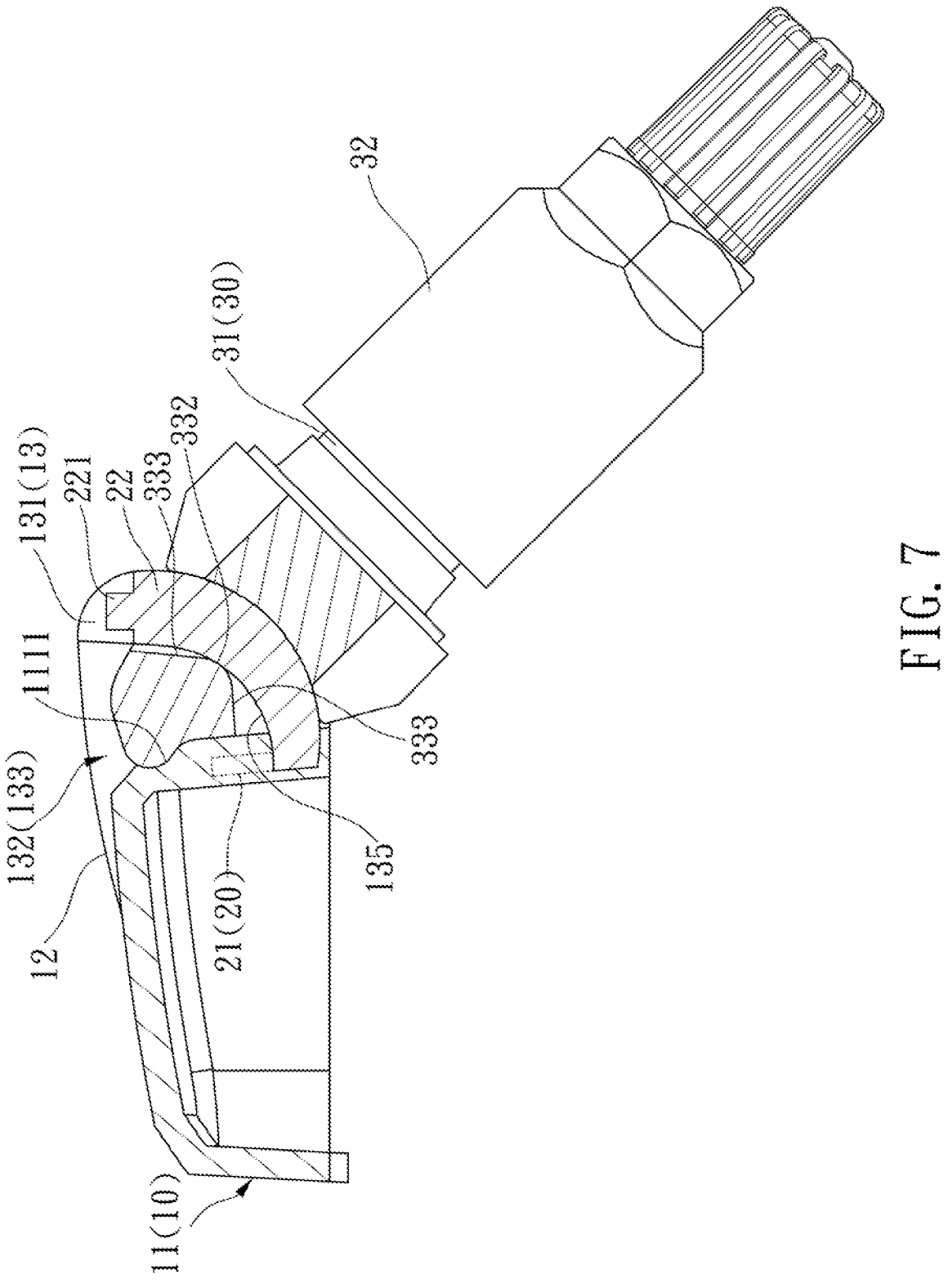
FIG. 7 is a cross-sectional view taken along line VII-VII of FIG. 1.
Figure 8:
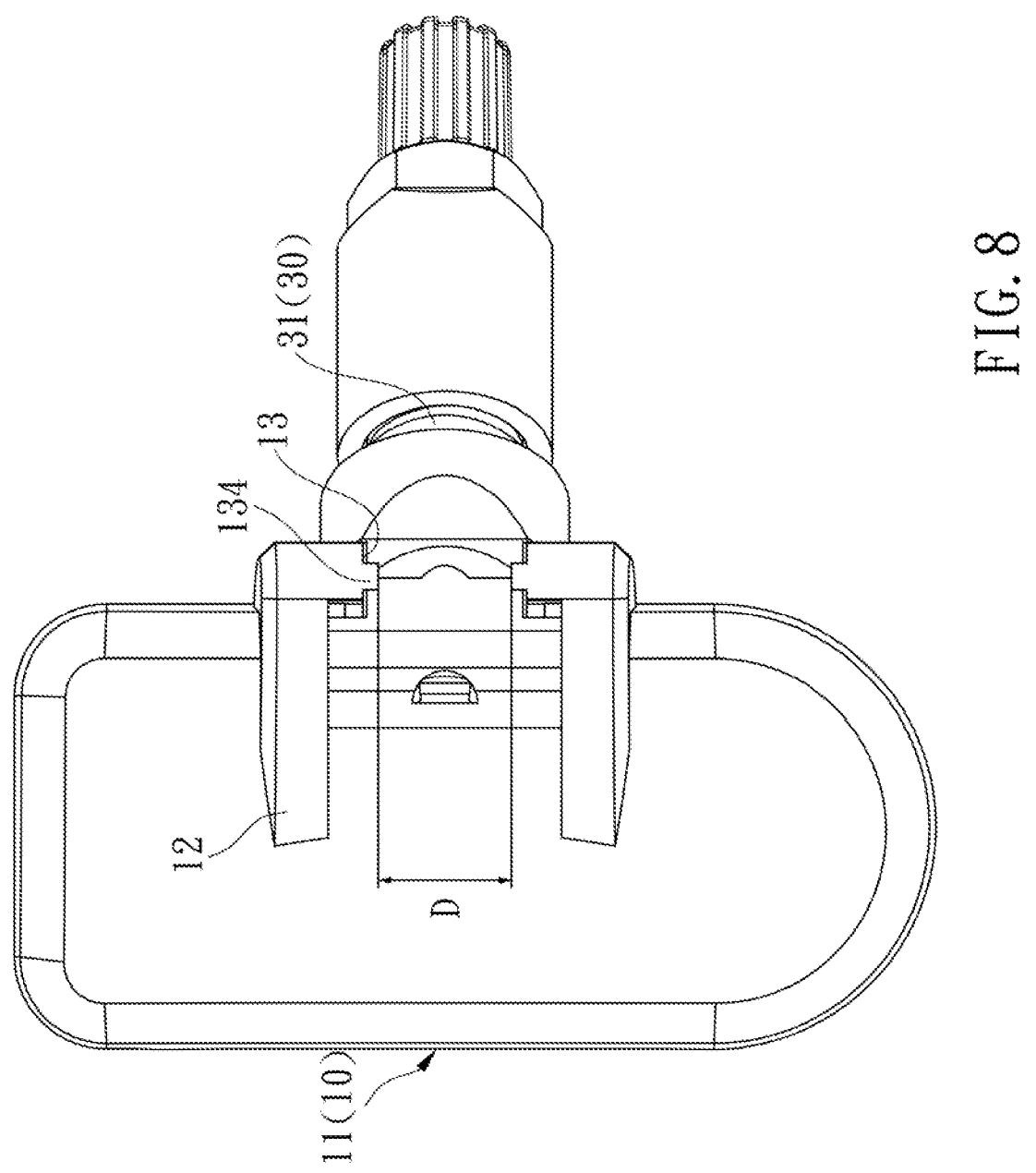
FIG. 8 is a top view of the present invention.
Figure 9:
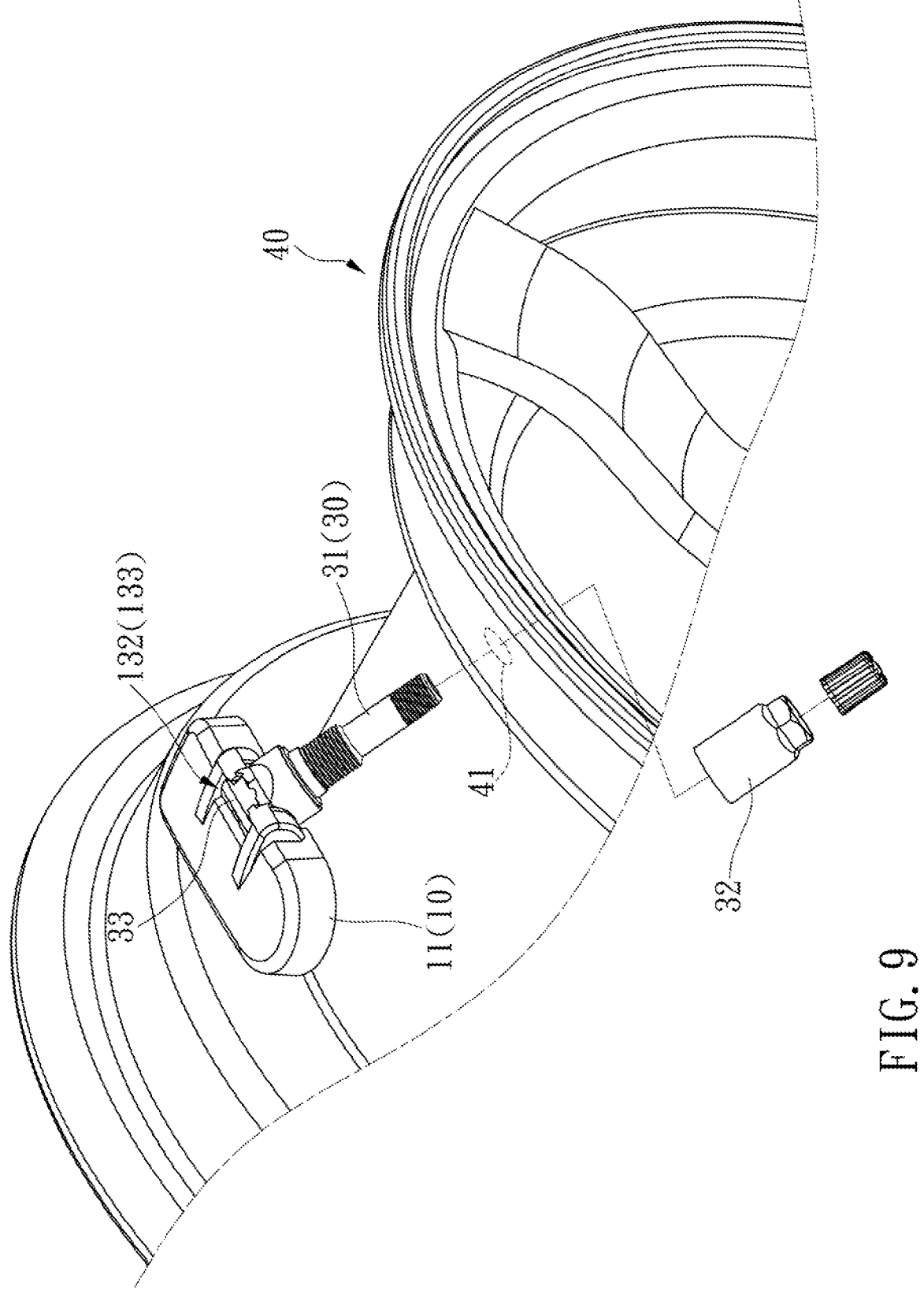
FIG. 9 is an exploded view of the present invention with the wheel rim.
Figure 10:
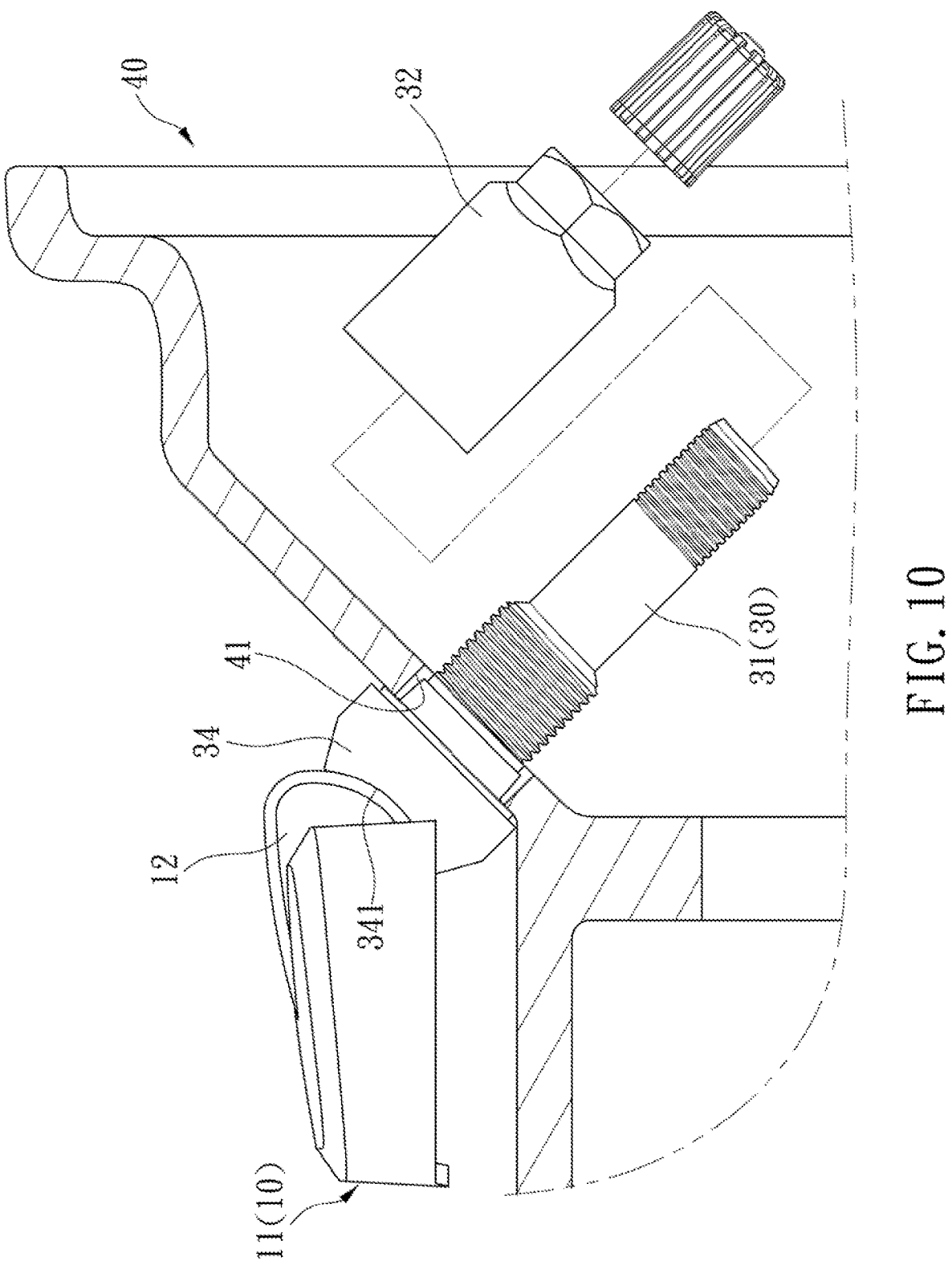
FIG. 10 is a partial cross-sectional view to show that the tube of the air valve of the present invention passes through the wheel rim hole.
Figure 11:
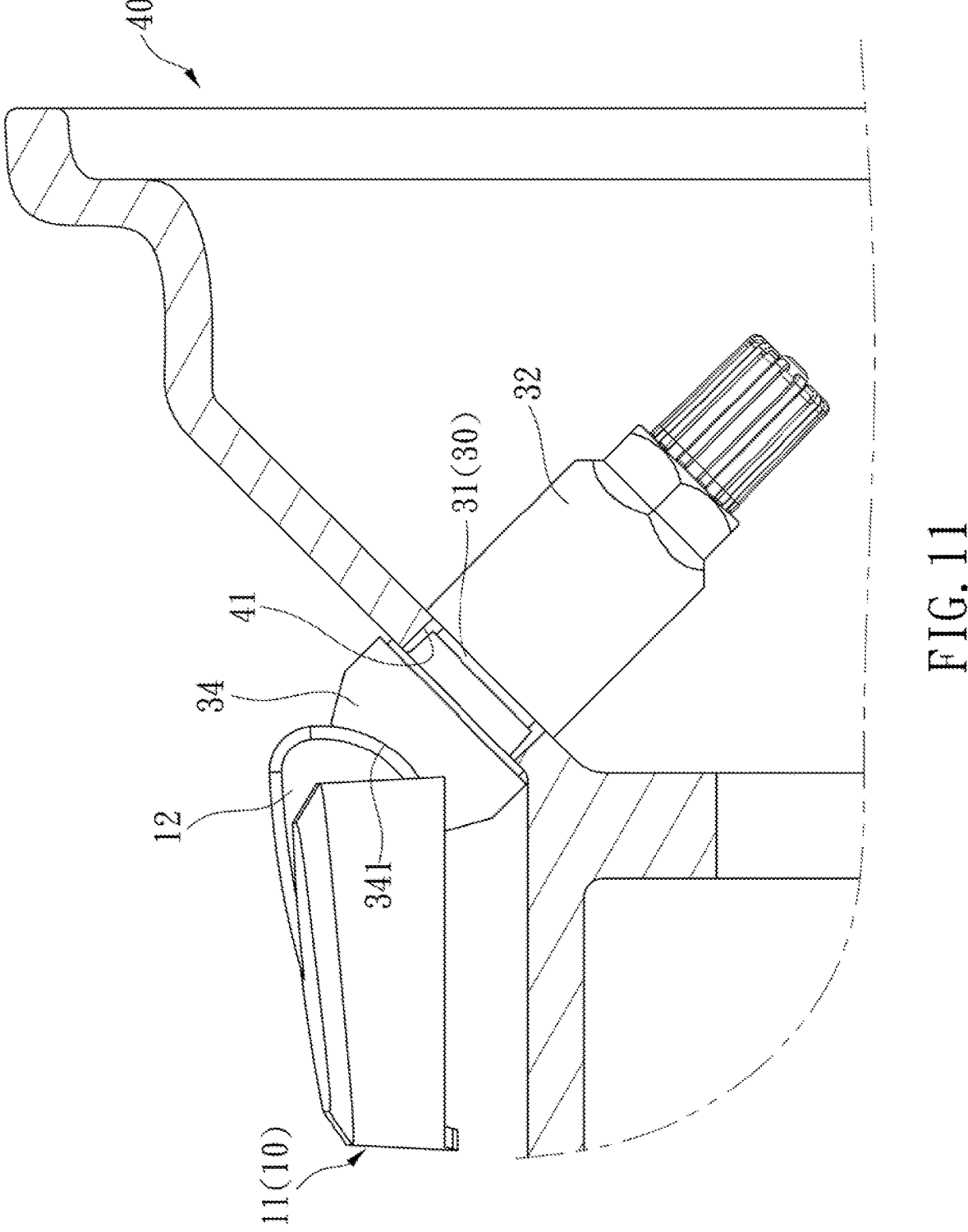
FIG. 11 is a partial cross-sectional view of the present invention after the present invention is assembled to the wheel rim.
Figure 12:
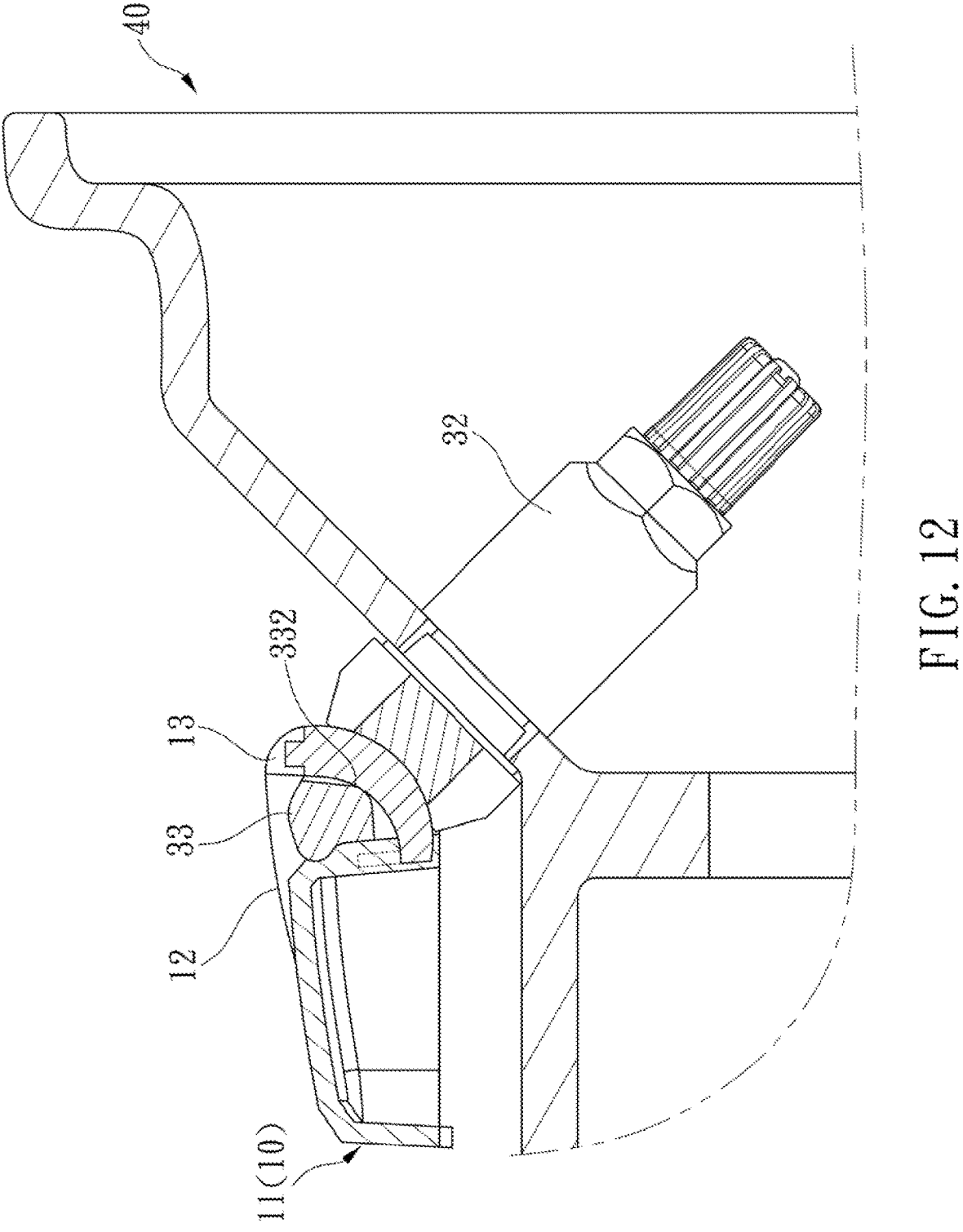
FIG. 12 is another partial cross-sectional view of the present invention after the present invention is assembled to the wheel rim.

As shown in FIGS. 1 to 8, when the present invention is installed and used with a wheel rim (40), as depicted in FIGS. 2, 6, and 7, a second end of the tube (31) of the air valve (30) passes through the body (11) between the face (111) and the wings. This allows the end portions (331) of the connector (33) to engage in the groove (132), and the protrusions (332) abut against the inside of the ridges (13), as illustrated in FIGS. 9 and 10. The tube (31) then passes through the rim hole (41) in the wheel rim (40). Therefore, as shown in FIGS. 11 and 12, when the nut (32) is rotated to move closer to the ridges (13), it can securely sandwich the wheel rim (40) in place. This action also causes the protrusions (332) of the connector (33) to be forcibly pressed against the inside of the ridges (13), achieving a one-time lock attachment in a single step.

Thus, compared to the prior art where the installation involves a two-stage process, with the first stage requiring the use of a bolt to assemble the body and the air valve, followed by the second stage involving the use of an air valve nut to tighten the wheel rim and the air valve, the present invention, as illustrated by the air valve 30 passing through the body (11) and the rim hole (41) using the tube (31), allows for the engagement of the end portions (331) of the connector (33) in the grooves (132). This enables the nut (32) to thread onto the tube (31), forcibly assembling it onto the wheel rim (40) in a single step, achieving a one-time lock attachment. This represents a clear advancement in the installation process.

Figure 13:
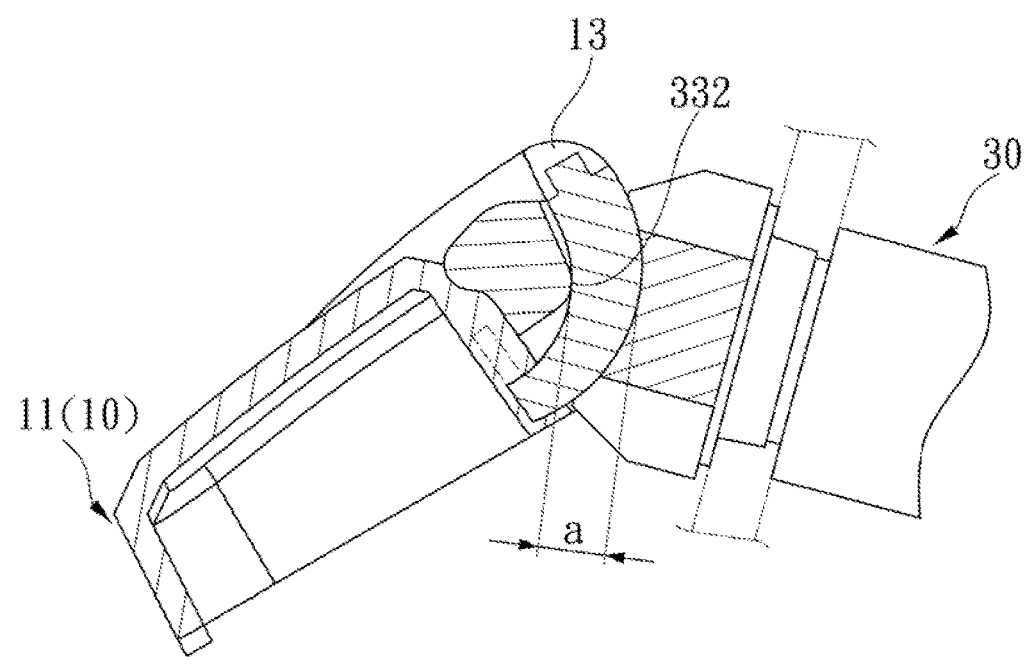
FIG. 13 shows that a smaller interference between the ridge and the protrusion when the ridge has a slight angle deviation from the body.
Figure 14:
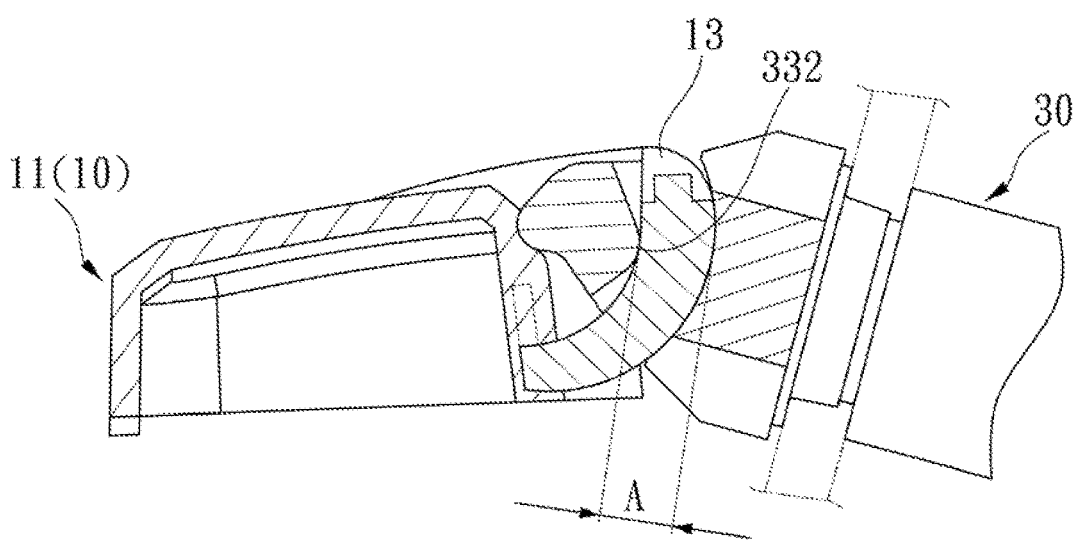
FIG. 14 shows that a larger interference between the ridge and the protrusion when the ridge has a slight angle deviation from the body.

Furthermore, as shown in FIGS. 13 and 14, when the body (11) of the present invention tilts relative to the air valve (30) due to centrifugal forces, the gradually expanding curved arc-shaped insides of the ridges (13) in relation to the protrusions (332) of the air valve (30) results in varying degrees of interference. In FIG. 14, the interference amount "A" created when the ridges (13) are at a large angle deviation from the body (11) is greater than the interference amount "a" in FIG. 13 when the ridges (13) have a small angle deviation from the body (11).

Therefore, the present invention utilizes the gradually increasing interference caused by the gradually expanding curved arc-shaped insides of the ridges (13) relative to the protrusions (332) of the air valve (30) to suppress the centrifugal force-induced tilting of the body (11) caused by the rotating wheel rim (40). This effectively enhances the firmness of the installation assembly and ensures stability in the performance of tire pressure detection.

As shown in FIGS. 1 to 14, the two ridges (13) each have a block (134) projecting from the enlarged end (131) corresponding thereto. The distance "D" between the two blocks (134) is less than the outer diameter of the tube (31) of the air valve (30). As shown in FIG. 8, by providing the opposing blocks (134), when the nut (32) in a non-tightened state, the present invention restricts the tube (31) of the air valve (30) from detaching from the body (11) of the sensor (10).

In this embodiment, the end portions (331) each have two flat surfaces (333), and the two flat surfaces (333) are connected to the end surface of the end portion (331) to form the protrusion (332). Therefore, by using the flat surfaces (333) on both sides of the protrusion (332), a reduced linear contact area with decreased friction is formed relative to the inside of the ridges (13). This helps reduce friction and wear during relative sliding.

In this embodiment, the air valve (30) includes a ring (34) which that movably fits over the tube (31) and is located between the connector (33) and the nut (32). The ring (34) has a recessed abutment portion (341) abutting against the ridges (13). Therefore, by the ring (34) located between the wheel rim (40) and the wings (12), along with contact between the recessed abutment portion (341) and the corresponding outside of ridges (13), additional support is effectively provided to enhance the stability of the assembly with the wheel (40).

In this embodiment, the air valve (30) further includes a seal ring (35), and the seal ring (35) is fitted around the tube (31) and is located between the ring (34) and the nut (32). Consequently, by providing the seal ring (35) installed between the wheel rim (40) and the ring (34), the seal ring (35) reinforces the airtightness of the assembly between air valve (30) and the wheel rim (40).

Figure 3:
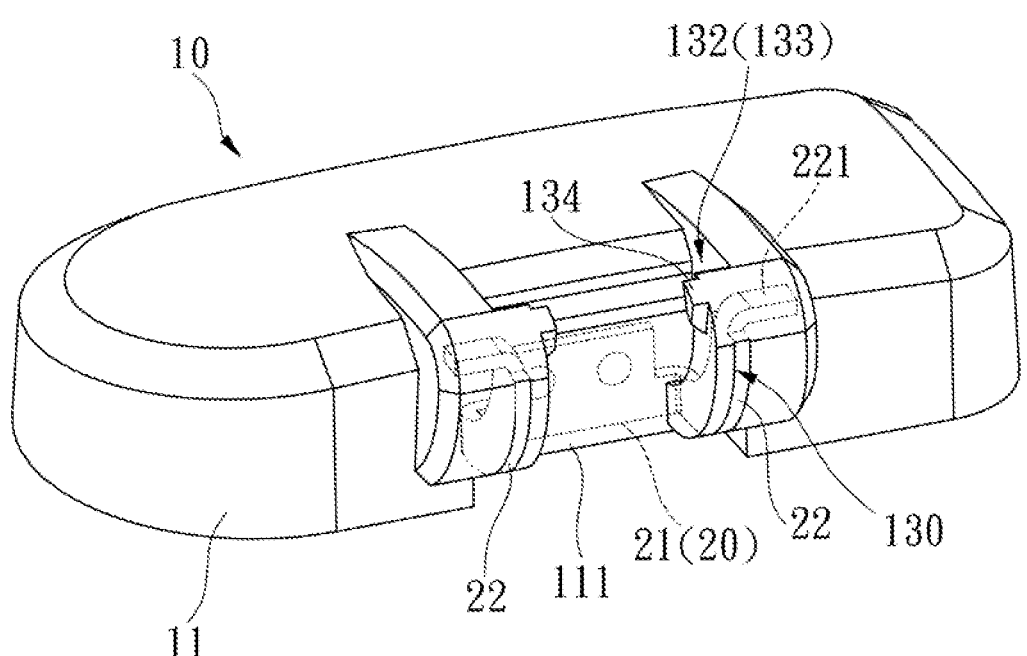
FIG. 3 is a perspective view of the tire pressure sensor of the present invention.

In this embodiment, the ridges (13) each have an inner surface (135) and an outer surface (136), wherein the inner surfaces (135) face the face (111) of the body (11). The reinforcing member (20) is connected to the body (11), the arms (22) are respectively inserted in the two slots (130) of the two ridges (13). Each of the two arms (22) is exposed from the inner surfaces (135) and outer surfaces (136), and is in alignment with the inner surfaces (135) and outer surfaces (136) as shown in FIGS. 3 to 5. Therefore, by having the arm (22) located in the slot (130) and in alignment with the inner surface (135) to reinforce the support force applied when the protrusion (332) is tightened against it, and by having the arm (22) located in the slot (130) and in alignment with the outer surface (136) to reinforce the support force on the outer surface (136).

In this embodiment, the two arms (22) of the reinforcing member (20) each have a segment (221) that is bent and extended from a distal end of the arm (22). By extending the segment (221) outward relative to the arm (22), it is further possible to enhance the structural strength of the arm (22) and the support stability of the air valve (30) when it is embedded in the combination with ridges (13).

In this embodiment, the face (111) of the body (11) has a concave portion (1111). The connector (33) has a protruding portion (334) located opposite to the protrusion (332). The protruding portion (334) abuts against the concave portion (1111) as shown in FIGS. 6 and 7. By providing the concave portion (1111), the protruding portion (334) of the connector (33) can be securely supported, ensuring a stable combination of the tube (31) of the air valve (30) with the body (11).

While we have shown and described the embodiment in accordance with the present invention, it should be clear to those skilled in the art that further embodiments may be made without departing from the scope of the present invention.

What is claimed is:

1. A tire pressure sensor attached to an air valve, comprising:

a sensor (10) comprising a body (11) and two wings (12) formed to the body (11), the body (11) including a face (111) located between the two wings (12), the two wings (12) having two opposing ridges (13) projecting towards respective insides of the two wings (12), the ridges (13), the face (111) and the wings (12) together form a groove (132) with an expanding opening (133), the ridges (13) each having an enlarged end (131) which is directed toward one side of the expanding opening (133);

a reinforcing member (20) installed inside the body (11) and including a plate (21), two arms (22) extending from two ends of the plate (21), the plate (21) connected to the face (111), the two arms (22) contacting the ridges (13);

an air valve (30) comprising a tube (31), a nut (32) and a connector (33) connected to one end of the tube (31), the connector (33) having two end portions (331) extending from two ends of the connector (33), the two end portions (331) protruding beyond the tube (31), the end portions (331) each having a protrusion (332), the tube (31) passing through a space between the face (111) and the two wings (12) and connected to the body (11), the end portions (331) of the connector (33) engaged in the groove (132), the protrusions (332) abutting an inside of the ridges (13), the nut (32) connected to the tube (31) and located close to the connector (33) to press the protrusions (332) against the inside of the ridges (13).

2. The tire pressure sensor attached to an air valve as claimed in claim 1, wherein the ridges (13) each have a block (134) projecting from the enlarged end (131) corresponding thereto, a distance between the two blocks (134) is less than an outer diameter of the tube (31) of the air valve (30).

3. The tire pressure sensor attached to an air valve as claimed in claim 1, wherein the end portions (331) each have two flat surfaces (333), the two flat surfaces (333) are connected to an end surface of the end portion (331) to form the protrusion (332).

4. The tire pressure sensor attached to an air valve as claimed in claim 1, wherein the air valve (30) includes a ring (34) which that movably fits over the tube (31) and is located between the connector (33) and the nut (32), the ring (34) has a recessed abutment portion (341) abutting against the ridges (13).

5. The tire pressure sensor attached to an air valve as claimed in claim 4, wherein the air valve (30) includes a seal ring (35) fitted over the tube (31) and located between the ring (34) and the nut (32).

6. The tire pressure sensor attached to an air valve as claimed in claim 2, wherein the ridges (13) each have an inner surface (135) and an outer surface (136), the inner surfaces (135) face the face (111) of the body (11), each of the two ridges (13) includes a slot (130) defined therethrough, the reinforcing member (20) is connected to the body (11), the arms (22) are respectively inserted in the two slots (130) of the two ridges (13), each of the two arms (22) is exposed from the inner surfaces (135) and outer surfaces (136), and is in alignment with the inner surfaces (135) and outer surfaces (136).

7. The tire pressure sensor attached to an air valve as claimed in claim 6, wherein the two arms (22) of the reinforcing member (20) each have a segment (221) that is bent and extended from a distal end of the arm (22).

8. The tire pressure sensor attached to an air valve as claimed in claim 1, wherein the face (111) of the body (11) has a concave portion (1111), the connector (33) has a protruding portion (334) located opposite to the protrusion (332), the protruding portion (334) abuts against the concave portion (1111).

* * * * *